United States Patent [19]

Ko

[11] Patent Number: 5,729,986
[45] Date of Patent: Mar. 24, 1998

[54] COOLING POWDERING METHOD WITH LOW TEMPERATURE GAS FLOW CIRCULATION

[75] Inventor: Hsi-Chia Ko, Changhua Hsien, Taiwan

[73] Assignee: Chung Cheng Faucet Co., Ltd., Changhua Hsien, Taiwan

[21] Appl. No.: 762,858

[22] Filed: Dec. 10, 1996

[51] Int. Cl.$^6$ .................................................. F25B 9/00
[52] U.S. Cl. .................................................. 62/87; 62/402
[58] Field of Search .................................. 62/86, 87, 401, 62/402

[56] References Cited

U.S. PATENT DOCUMENTS 5,317,904  6/1994  Bronicki ........................... 62/401

Primary Examiner—Ronald C. Capossela
Attorney, Agent, or Firm—Bacon & Thomas

[57] ABSTRACT

A cooling powdering method with low temperature gas flow circulation including a gas expansion cooling circulation system, a low temperature gas flow powdering system and a material refrigerating system. The gas expansion cooling circulation system serves to provide cold capacity for the low temperature gas flow powdering system and material refrigerating system and the gas flow powdering machine serves to powder the material. The method is able to powder those materials which are impossible or difficult to be powdered at normal temperature, especially for resilient polymer materials and high resilient bodies.

4 Claims, 2 Drawing Sheets

COOLING POWDERING METHOD WITH LOW TEMPERATURE GAS FLOW CIRCULATION

BACKGROUND OF THE INVENTION

The present invention relates to a cooling powdering method with low temperature gas flow circulation, in which a mechanical expander and a gas flow powdering machine are combined to powder those materials which are impossible or difficult to be powdered at normal temperature.

A gas flow powdering machine is widely used for powdering solid material into fine or super fine powder at normal temperature. However, a certain restriction exists in such gas flow powdering operation at normal temperature. For example, such measure is not suitable to viscous resilient polymer and highly resilient body. Also, such measure is not suitable for those materials which are subject to deterioration when powdered at normal temperature. For those materials which are difficult to be powdered at normal temperature, a refrigeration powdering measure is often adopted. That is, liquid nitrogen or solid carbon dioxide is used as a coolant to lower the temperature of the material below a glassy temperature and then a mechanical powdering machine is used to powder the material. For example, in recovering waste tire, the waste tire is first dipped into liquid nitrogen to become brittle and then a hammer type powdering machine is used to powder the waste tire. Liquid nitrogen or carbon dioxide is used as coolant in such powdering measure so that a cooperative air separating device must be installed near the powdering machine. Such measure has great loss of cold capacity and it is difficult to recover the cold capacity so that the cost of powdering operation is quite high.

SUMMARY OF THE INVENTION

It is therefore a primary object of the present invention to provide a cooling powdering method with low temperature gas flow circulation, in which a mechanical expander is used to perform gas circulation cooling operation and a gas flow powdering machine is used to powder the material. The present invention serves to powder those materials which are difficult to be powdered at normal temperature or are subject to deterioration when powdered at normal temperature, such as waste tires, waste plastic articles, plants, animals, etc. The present invention is free from any air separation equipment for obtaining liquid nitrogen as coolant. Therefore, the structure is simplified and the energy can be completely recovered. During the powdering operation, the temperature of the material will not increase and the material in the gas flow powdering machine is always kept in an optimal state. The present invention includes three systems as follows:

1. Gas expansion cooling circulation system composed of a compressor, mechanical expanders, first through fourth heat exchangers, a pre-cooling device and a refrigerating device. The compressed gas expands to provide low temperature cold gas source. The cold capacity of this system can be fully recovered for re-use so that the energy consumption is reduced.

2. Low temperature gas flow powdering system composed of fifth and sixth heat exchangers, gas flow powdering machine and de-dusting device. In the system, the gas flow is cooled to a suitable temperature to ensure that the material is in a best cracky state. The cold capacity of the de-dusted gas and the products are respectively recovered in the heat exchangers.

3. Material refrigerating system composed of a precooling device and a refrigerating device. In the system, the material is fully refrigerated to a necessary temperature for easy powdering.

The present invention can be best understood through the following description and accompanying drawings, wherein:

DETAILED DESCRIPTION OF THE PREFERRED EMBODIMENTS

Figure 1:
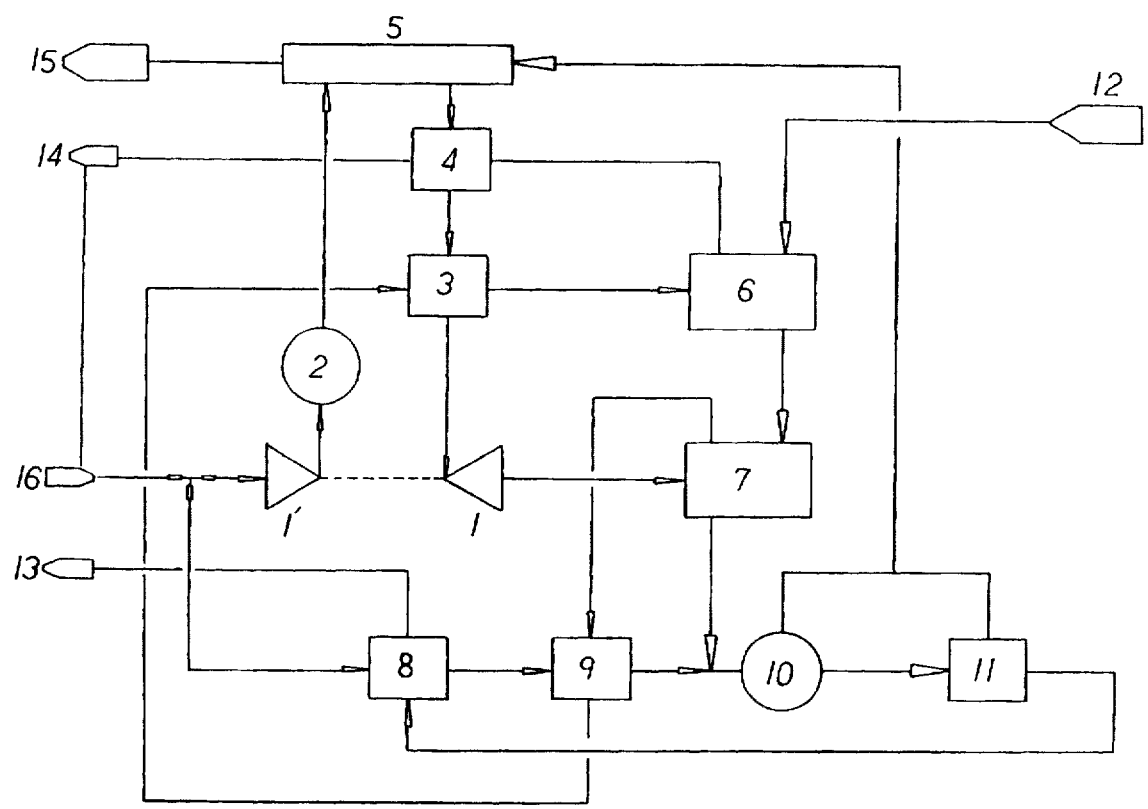
FIG. 1 is a flow chart of the present invention.

Please refer to FIG. 1. The present invention includes a gas expansion cooling circulation system composed of a water cooler 2 (first heat exchanger), second through fifth heat exchangers 5, 4, 3 and 9, a pre-cooling device 6, a refrigerating device 7 and an expander 1. The expander 1 can be a piston type expander or a turbine expander. In the case of piston type expander, no gas compressor 1' is needed and a compressor station will directly provides 0.8 to 1.6 MPa dry gas source. The water cooler 2 employs a pipe heat exchanger. The third through fifth heat exchangers 4, 3 and 9 can be pipe heat exchangers, panel heat exchangers or panel wing heat exchangers. Second heat exchanger 5 can be a spiral heat exchanger with a clipping sleeve, using a high temperature gas source or an electrosteam to indirectly heat solid material or using low pressure gas flow to directly exchange heat by contact. The pre-cooling device 6 and refrigerating device 7 are composed of gas flow refrigerating pipe or various types of flow beds and de-dusting devices for ensuring the refrigerating time of the material.

The procedure of FIG. 1 also includes a low temperature gas flow powdering system composed of fifth and sixth heat exchangers 9 and 8, gas flow powdering machine 10 and de-dusting device 11. The gas flow powdering machine 10 can be of flat type, circulation pipe type or target type. The Joule Thomson effect occurring when high pressure gas passes through the nozzle will further lower the gas flow temperature to compensate the powdering heat of the material, whereby the powdered material is kept in a low temperature state. Sixth heat exchanger 8 can be of pipe type, panel type or panel wing type. The de-dusting device can be an eddy separator with bag de-dusting device or eddy separator with passage filter.

Figure 2:
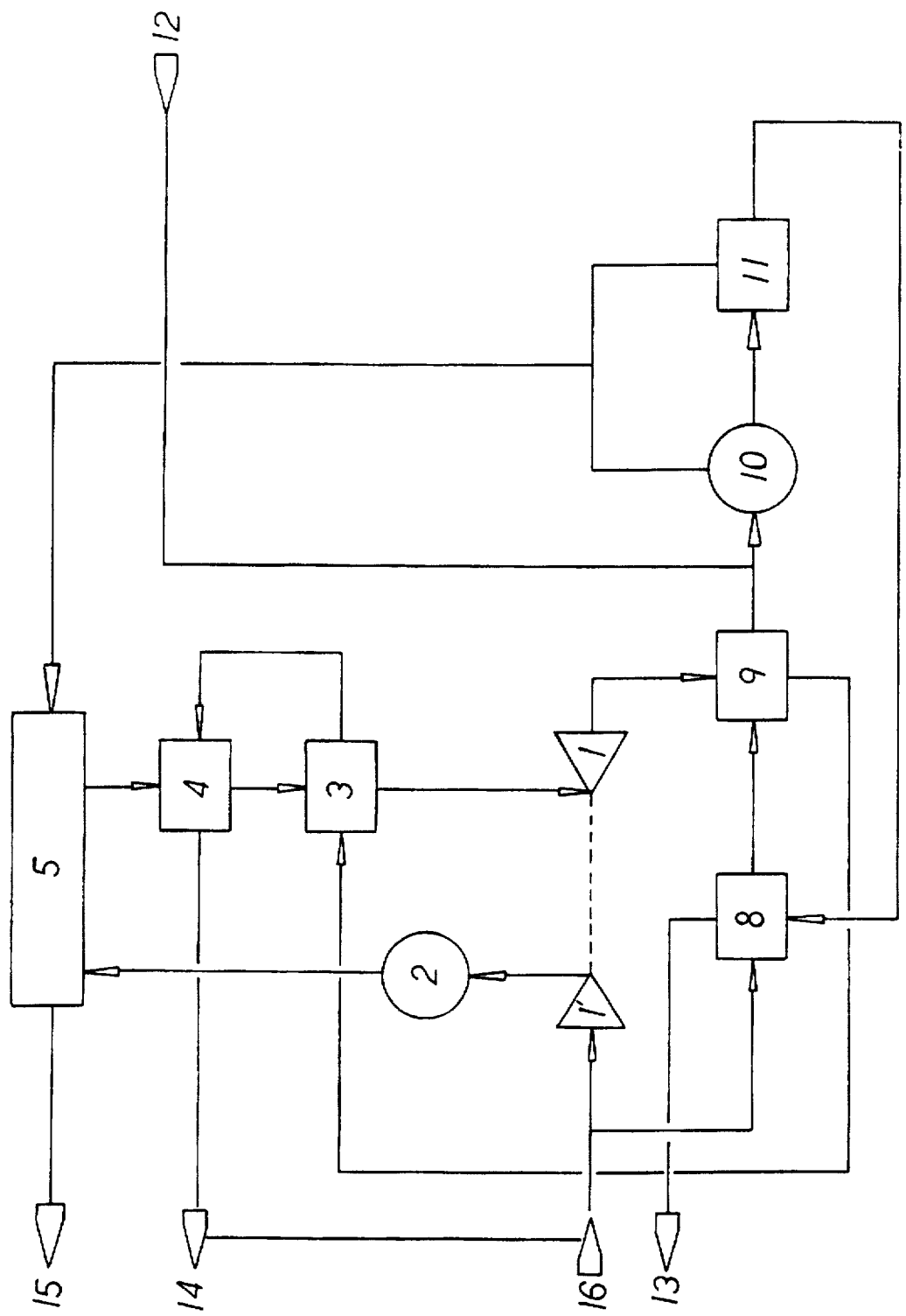
FIG. 2 is a simplified flow chart according to FIG. 1, which is suitable for those materials which are not necessary to be refrigerated before entering the gas flow powdering machine.

The procedure of FIG. 1 further includes a material refrigerating system composed of a pre-cooling device 6 and a refrigerating device 7. In the system, according to the property of the material, production dimension and requirement for the products, the pre-cooling device 5 can be omitted and the material under normal temperature can directly enter the refrigerations device 7 for refrigeration. Alternatively, the material refrigerating system can be totally omitted, whereby the material will directly enter the low temperature gas flow powdering machine without refrigeration as shown in the procedure of FIG. 2.

In FIG. 1, according to the property of the material, gases such as air, nitrogen and carbon dioxide can be used as powdering and cooling media.

The following is an application of the present invention to waste tire recovering:

A dry compressed gas 16 of about 0.6 MPa is divided into two flows by a throttle valve. One flow passes through the gas compressor 1' of the turbine expander to be pressurized to 0.8 MPa and respectively pass through second through fourth heat exchangers 5, 4, 3 with temperature lowered to −50 C. and enter the expander 1 for expansion. The temperature is further lowered to about −90 C. and the gas further sequentially enters the refrigerating device 7, fourth and fifth heat exchangers 3, 9, pre-cooling device and third heat exchanger 4 to provide cold capacity to the material and the gas flow at entrance of the gas flow powdering machine and then return to the inlet 14 of the compressor to complete the gas circulation. The other flow of compressed gas passes through fifth and sixth heat exchangers 9, 8 with temperature lowered to −50 C. to −60 C. and goes into the gas flow powdering machine along with the refrigerated rubber granules to powder the rubber granules. After passing through the de-dusting device 11, in sixth heat exchanger 8 the gas flow releases the cold capacity and is exhausted at 13. The exhausted gas can be recovered at a gas source purifying section. After the waste tire is ground, de-fibered, magnetically selected and sorted by screen, rubber granules 12 under 5 mm are obtained, which are added to the pre-cooling device 6 and refrigerating device 7 by constant amount and stay there for about 0.8 hour with temperature lowered to −50 to −60 C. The granules are powdered by low temperature gas flow powdering machine. The cold rubber powders are sorted and packed 15 after reheated by the second heat exchanger 5.

The final product will have properties as follows: The powder diameter is less than 0.2 mm, true specific weight is 1.14 to 1.16, slack specific weight is 0.35, ash ratio is less than 10%, acetone extraction is less than 10% and the rubber particle is spherical.

The above embodiments are only some examples of the present invention and the scope of the present invention should not be limited to the examples. Any modification or variation derived from the examples should fall within the scope of the present invention.

What is claimed is:

1. A cooling powdering method with low temperature gas flow circulation using, a gas expansion cooling circulation system, and a low temperature gas flow powdering system, wherein the gas expansion cooling circulation system includes a mechanical compressor/expander, and first through sixth heat exchangers, comprising the steps of: pressurizing a dried and purified compressed inlet gas by passing a first portion of the gas through a gas compressor of the compressor/expander and subsequently passing the gas through the first, second, third and fourth, heat exchangers to be cooled to a predetermined temperature, and then entering the mechanical expander for expansion to a lower temperature, the gas being sent to a gas flow powdering device for directly refrigerating a material to be powdered; separating the gas from the powdered material and passing the gas through the fifth, fourth and third heat exchangers; and returning the gas to an inlet of the compressor; passing a second portion of the inlet gas through the low temperature gas flow powdering system comprising the additional steps of: passing the second portion of the gas through the fifth heat exchanger and cooled to a predetermined temperature to flush the refrigerated material to be powdered into the gas flow powdering machine; passing the gas through the de-dusting device, and the sixth heat exchanger, to re-heat the gas flow and subsequently exhausting the second portion of the gas from the system; supplying material to be powdered to the gas flow powder machine causing the material to be powdered; and sorting and packing the powdered material after passing the powdered material through the second heat exchanger, to re-heat the powdered material.

2. The method as claimed in claim 1, wherein the mechanical compressor/expander comprises a turbine expander.

3. The method as claimed in claim 1, comprising the steps of using gases such as air, nitrogen and carbon dioxide as powdering and cooling media in the gas expansion cooling circulation system and the low temperature gas flow powdering system.

4. The method as claimed in claim 1 wherein the system further comprises a pre-cooling device and a refrigerating device and comprises the further steps of passing the first portion of the gas into the refrigerating device after exiting from the mechanical compressor/expander and before passing into the fifth heat exchanger; passing the first portion of gas through the fourth and third heat exchangers; and passing the material to be powdered through the pre-cooling device and the refrigerating device before entering the gas flow powdering machine.

\* \* \* \* \*